(12) United States Patent
Sakurai et al.

(10) Patent No.: US 7,112,141 B2
(45) Date of Patent: Sep. 26, 2006

(54) POWER TRANSMISSION SHAFT

(75) Inventors: Katsuhiro Sakurai, Shizuoka (JP);
Tohru Nakagawa, Shizuoka (JP);
Kisao Yamazaki, Shizuoka (JP)

(73) Assignee: NTN Corporation, Osaka (JP)

( * ) Notice: Subject to any disclaimer, the term of this patent is extended or adjusted under 35 U.S.C. 154(b) by 170 days.

(21) Appl. No.: 10/847,322

(22) Filed: May 18, 2004

(65) Prior Publication Data

US 2004/0235575 A1 Nov. 25, 2004

(30) Foreign Application Priority Data

May 19, 2003 (JP) ............... 2003-140566

(51) Int. Cl.
*F16C 3/02* (2006.01)
(52) U.S. Cl. .................... 464/183; 403/359.1
(58) Field of Classification Search ........... 464/178, 464/182, 183, 902; 148/570–572; 403/359.1, 403/359.5, 359.2, 359.3, 359.4, 359.6
See application file for complete search history.

(56) References Cited

U.S. PATENT DOCUMENTS 3,024,626 A * 3/1962 Frischman ............ 464/902
4,392,839 A * 7/1983 Aucktor ............... 464/183
6,800,033 B1 * 10/2004 Ouchi .................. 464/178
2003/0081872 A1 * 5/2003 Sahashi et al.
2004/0171428 A1 * 9/2004 Tajima et al. ......... 464/178

FOREIGN PATENT DOCUMENTS

JP  2001-208037  8/2001

* cited by examiner

*Primary Examiner*—Greg Binda
(74) *Attorney, Agent, or Firm*—Wenderoth, Lind & Ponack, L.L.P.

(57) ABSTRACT

An integral hollow type power transmission shaft is proposed which is superior in the balance between the static strength and the fatigue strength. The integral hollow type shaft is induction-hardened from the outer periphery to form a hardened layer, leaving an unhardened layer at spline portions, so that at the spline portions, the hardness on the inner surface will be lower than at other portions. This increases the toughness and compressive residual stress of the shaft at the spline portions, which tend to be starting points of fatigue cracks, thus improving the balance between the static strength and the fatigue strength.

8 Claims, 3 Drawing Sheets

POWER TRANSMISSION SHAFT

BACKGROUND OF THE INVENTION

This invention relates to a power transmission shaft for transmitting power with both ends of the shaft connected to joints such as constant-velocity universal joints.

Among transmission shafts for transmitting power with both ends connected to joints, there are ones in which the joint connecting portions are integrally formed at both ends and which are formed hollow over the entire length thereof. As such integral, hollow type power transmission shafts, ones in which one or both of the joint connecting portions are spline portions inserted into the joints are often used. For example, as power transmission shafts for power transmission mechanisms of vehicles, ones in which the joint connecting portions on both sides are spline portions inserted in the inner rings of constant-velocity universal joints are often used.

Such integral, hollow type power transmission shafts have an advantage that it is possible to achieve equivalent static strength while being lighter in weight than solid ones. As means for strengthening this type of power transmission shaft, induction hardening from outer peripheries and work-hardening means by reducing diameters are often employed. There are also ones in which the intermediate portion of the shaft is strengthened by work-hardening, and the joint connecting portions at both ends thereof are strengthened by induction hardening (JP patent publication 2001-208037).

This integral hollow type power transmission shaft, in which at least one of the joint connecting portions is a spline portion, differs from solid ones in the balance between the static strength and the fatigue strength. Thus, if it is designed so as to obtain static strength equivalent to that of a solid type while reducing its weight, it will be inferior in fatigue strength to a solid one. Fatigue cracks tend to occur with the rising portions of the splines as starting points.

An object of this invention is to provide an integral hollow type power transmission shaft that is superior in the balance between the static strength and the fatigue strength.

SUMMARY OF THE INVENTION

According to this invention, there is provided a power transmission shaft which has joint connecting portions at both ends, and is hollow over the entire length thereof, at least one of the joint connecting portions being a spline portion to be inserted into a joint, characterized in that the shaft is induction-hardened from the outer periphery thereof so that at the spline portions, the hardness on the inner surface of the shaft is lower than at other portions.

That is, by employing induction hardening from the outer periphery as means for strengthening the shaft so that the hardness on the inner surface at the spline portions will be lower than the hardness on the inner surface of the shaft at other portions, the toughness and the compressive residual stress of the shaft at the spline portions, which tend to be starting points of fatigue breakage, increase, so that the balance between the static strength and the fatigue strength will improve.

The difference in hardness between the outer surface and the inner surface of the shaft at the spline portions is preferably not less than Δ HRC 9 in the Rockwell hardness. The lower limit Δ HRC of the hardness difference was found from the results of the below-described twisting fatigue test.

The ratio of the hardened depth to the wall thickness of the shaft at the spline portions is preferably not less than 0.3, and the hardness on the inner surface of the shaft at the spline portions is not more than HRC 43 in Rockwell hardness. The lower limit of the hardened depth ratio of 0.3 and the upper limit HRC 43 of the hardness on the inner surface of the shaft were also found from the results of the twisting fatigue test.

By leaving unhardened layers on the inner surface of the shaft at the spline portions, it is possible to more reliably ensure the toughness of the shaft at the spline portions.

By smoothly deepening the hardened depth at the spline portions from their tips toward proximal ends, it is possible to increase the strength of the shaft at the proximal ends of the spline portions, where loads from joints are large, and to prevent stress concentration.

Portions of the shaft where the hardness on the inner surface of the shaft is lower than at other portions respectively have inner end terminal portions preferably located adjacent to spline shoulder portions provided at the proximal ends of the spline portions.

BRIEF DESCRIPTION OF THE DRAWINGS

Other features and objects of the present invention will become apparent from the following description made with reference to the accompanying drawings, in which.

DETAILED DESCRIPTION OF THE PREFERRED EMBODIMENTS

Figure 1:
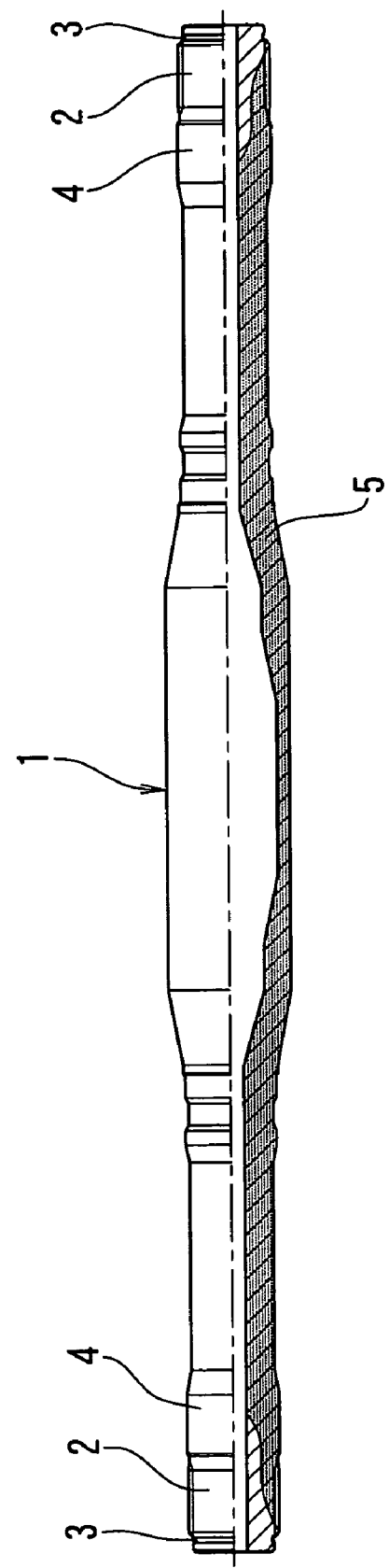
FIG. 1 is a cutaway vertical sectional view showing an embodiment of the power transmission shaft.

With reference to FIGS. 1–5, the embodiments of this invention will be described. This power transmission shaft is for a power transmission mechanism for a vehicle. As shown in FIG. 1, it includes an integral, hollow type shaft 1 which is hollow over the entire length, and spline portions 2 as joint connecting portions to be connected to constant-velocity universal joints (not shown) on both sides. At the tip of each spline portion 2, a snap ring groove 3 for fixing the inner ring of a constant-velocity universal joint is provided, and at the proximal end thereof, a spline shoulder portion 4 is provided. The shaft 1 is formed of a structural carbon steel pipe (STKM) and is subjected to induction hardening from its outer periphery to form a hardened layer 5 over the entire length thereof except the tip portions of the spline portions 2.

Figure 2:
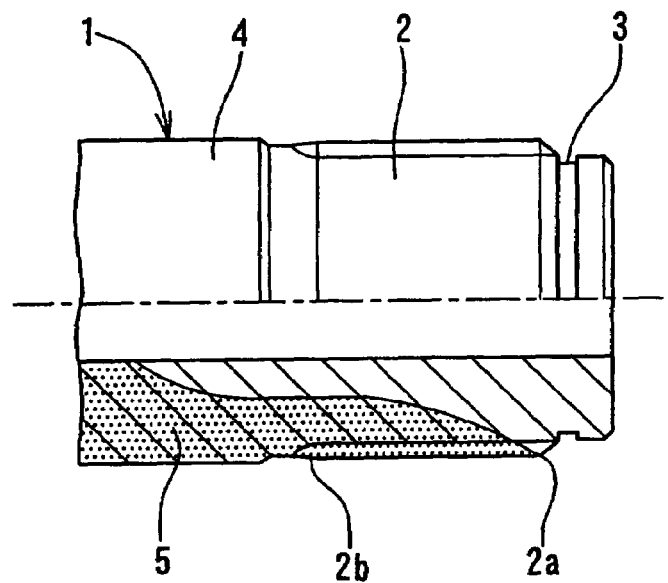
FIG. 2 is an enlarged cutaway vertical sectional view showing a portion near a spline portion of FIG. 1.

As shown in FIG. 2, near the spline portions 2, the hardened layer 5 smoothly deepens from the tip 2a of the spline portion 2 toward the proximal end 2b, curving in the shape of the letter S, so as to reach the inner surface of the shaft 1 near each spline shoulder portion 4. Thus, at each spline portion 2, an unhardened layer remains on the inner surface of the shaft 1.

Figure 3:
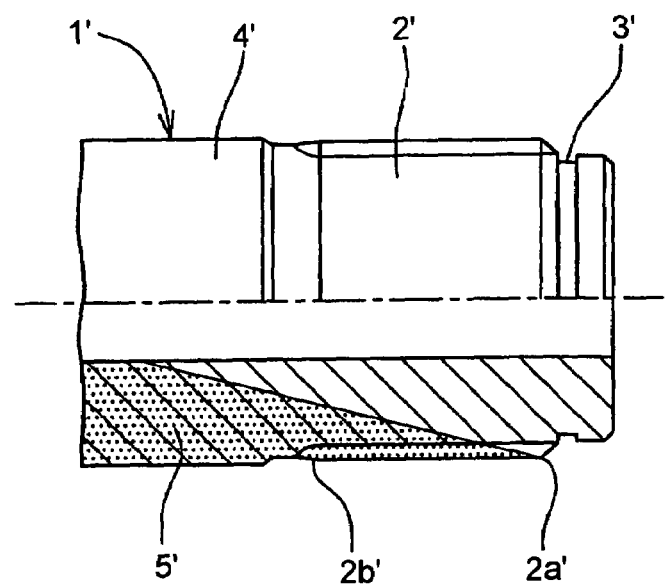
FIG. 3 is a cutaway vertical sectional view showing a modified embodiment.

FIG. 3 shows a modified example of a hardened layer 5' near spline portions 2'. In the modified example, the hardened layer 5' deepens linearly from a tip 2a' of the spline portion 2' and reaches the inner surface of a shaft 1' at a point near a spline shoulder portion 4'. Similarly to the example shown in FIG. 2, the example of FIG. 3 shows the spline portion 2' having a proximal end 2b', and a snap ring groove 3' is provided at the tip of each spline portion 2'

Below, Examples and Comparative Examples are cited.

Examples

As examples, power transmission shafts which are the shaft 1 of the embodiment shown in FIG. 1 having different ratios γ of the hardening depth of the hardened layer 5 to the wall thickness of the shaft 1 were prepared (Examples 1–11). The hardening depth ratio γ was defined by the hardening depth value at the proximal end 2b of the spline portion 2 shown in FIG. 2. As Comparative Examples, similar power transmission shafts were prepared (Comparative Examples 1–2) in which a hardened layer was formed over the entire wall thickness of the shaft 1 except at the portion that is nearer to the tip than is the snap ring groove 3.

For the power transmission shafts of the Examples and Comparative Examples, with the spline portion 2 on one side inserted into the inner ring of a constant-velocity universal joint, a one-direction twisting fatigue test was conducted to examine the number N of repeated twistings until fatigue cracks appear. The number N of repeated twistings in the fatigue test was stopped at $2.0 \times 10^6$.

TABLE 1

Results of Fatigue Tests

| shaft | Hardening depth ratio γ | Inner surface hardness HRC | Hardness difference ΔHRC | Number of repeated twistings N until fatigue cracks appear |
|---|---|---|---|---|
| Example 1 | 0.30 | 26 | 26 | $8.0 \times 10^5$ |
| Example 2 | 0.44 | 20 | 32 | $9.5 \times 10^5$ |
| Example 3 | 0.54 | 21 | 31 | $1.1 \times 10^6$ |
| Example 4 | 0.60 | 23 | 29 | $>2 \times 10^6$ |
| Example 5 | 0.60 | 24 | 28 | $1.2 \times 10^6$ |
| Example 6 | 0.62 | 28 | 24 | $>2 \times 10^6$ |
| Example 7 | 0.71 | 30 | 22 | $>2 \times 10^6$ |
| Example 8 | 0.72 | 31 | 21 | $>2 \times 10^6$ |
| Example 9 | 0.85 | 34 | 18 | $>2 \times 10^6$ |
| Example 10 | 0.96 | 37 | 15 | $>2 \times 10^6$ |
| Example 11 | 1.00 | 43 | 9 | $>2 \times 10^6$ |
| Comp. Example 1 | 1.00 | 53 | 3 | $4.3 \times 10^5$ |
| Comp. Example 2 | 1.00 | 53 | 3 | $5.4 \times 10^5$ |

Figure 4:
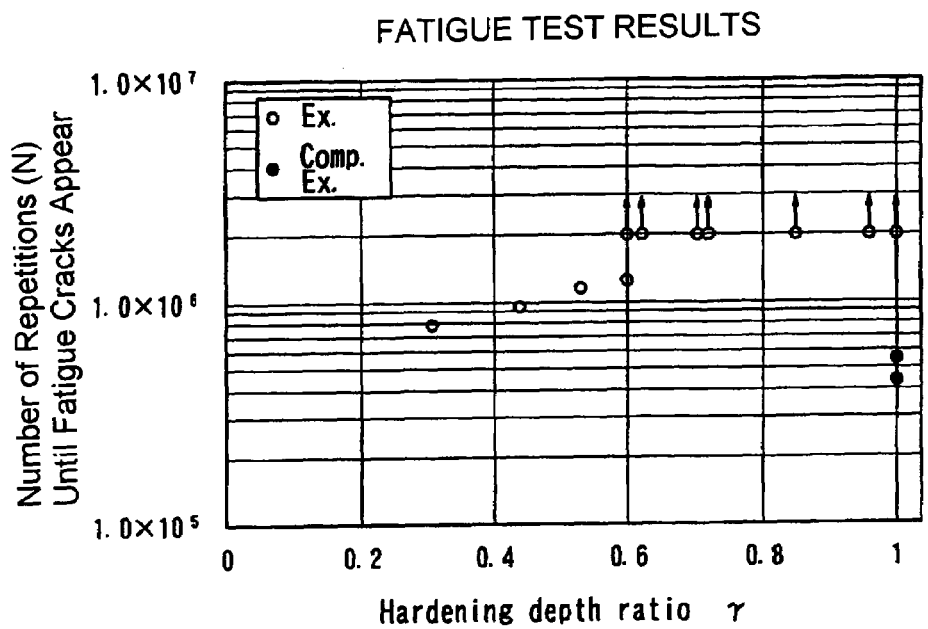
FIG. 4 is a graph showing the relation between the hardened depth ratio γ and the number N of repeated twistings in a fatigue test.
Figure 5:
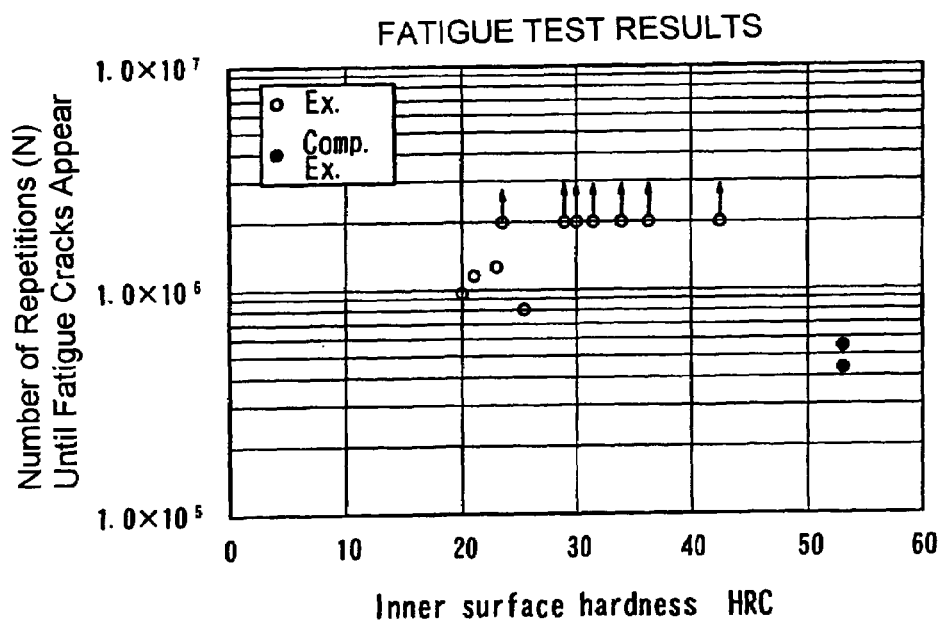
FIG. 5 is a graph showing the relation between the inner surface hardness HRC and the number N of repeated twistings in a fatigue test.

The results of the fatigue test are shown in Table 1 and FIGS. 4 and 5. In Table 1, besides the hardening depth ratio γ, the inner surface hardness HRC of the shaft 1 at the proximal end 2b of the spline portion 2 where the hardening depth ratio γ was defined, and the difference in hardness Δ HRC between the inner surface and the outer surface are also shown. In all of the Examples 1–11, the inner surface hardness was not more than HRC 43 and the difference in hardness between the inner and outer surfaces was not less than Δ HRC 9. FIG. 4 is a graph in which the relation between the hardening depth ratio γ and the number of repeated twistings N is plotted based on the results of Table 1. FIG. 5 is a graph in which the relation between the inner surface hardness HRC and the number N of repeated twistings is plotted.

From these results, it is apparent that while for the Comparative Examples, in which a hardened layer was formed over the entire wall thickness, the outer surface hardness was HRC56, the inner surface hardness was HRC53, and the number N of repeated twistings was $5.0 \times 10^5$, for the Examples, in which the inner surface hardness was lower than the outer surface hardness, the number N of repeated twistings was not less than $8.0 \times 10^5$, so that the fatigue strength improved markedly.

In the Embodiments, while the joint connecting portions on both sides were spline portions, the power transmission shaft according to the present invention is applicable to one in which the joint connecting portion on one side only is a spline portion.

As described above, in the power transmission shaft of this invention, as means for strengthening an integral, hollow shaft, induction hardening from the outer periphery is employed so that the hardness on the inner surface of the shaft at the spline portions is lower than the hardness on the shaft inner surface at other portions, thereby increasing the toughness and compressive residual stress of the shaft at the spline portions, which tend to be starting points of fatigue cracks, and improving the balance between the static strength and the fatigue strength. Thus, it is suitable for e.g. a driving force transmission mechanism of an automobile for which lightweight is required.

What is claimed is:

1. A power transmission shaft comprising:
   a shaft which has joint connecting portions integrally provided at both ends, and is hollow over the entire length thereof;
   wherein at least one of said joint connecting portions being a spline portion to be inserted into a joint; and
   wherein said shaft is subjected to induction hardening from the outer periphery thereof so that at the spline portions, the hardness on the inner surface of the shaft is lower than at other portions.

2. A power transmission shaft as claimed in claim 1 wherein
   the difference in hardness between the outer surface and the inner surface of the shaft at said spline portions is not less than Δ HRC 9 in the Rockwell hardness.

3. A power transmission shaft as claimed in claim 2 wherein the ratio of the hardened depth to the wall thickness of the shaft at said spline portions is not less than 0.3, and the hardness on the inner surface of the shaft at the spline portions is not more than HRC 43 in Rockwell hardness.

4. A power transmission shaft as claimed in claim 1 wherein
   the ratio of the hardened depth to the wall thickness of the shaft at said spline portions is not less than 0.3; and
   the hardness on the inner surface of the shaft at the spline portions is not more than HRC 43 in Rockwell hardness.

5. A power transmission shaft as claimed in claim 1 wherein
   at said spline portions, unhardened layers remain on the inner surface of the shaft.

6. A power transmission shaft as claimed in claim 1 wherein
   the hardened depth at said spline portions is such that it smoothly deepens from a tip end of said each spline portion toward a proximal end thereof.

7. A power transmission shaft as claimed in claim 1 wherein
   portions of the shaft where the hardness on the inner surface of the shaft is lower than at other portions respectively have inner end terminal portions located adjacent to spline shoulder portions provided at the proximal ends of said spline portions.

8. A power transmission shaft comprising:

a shaft which has joint connecting portions integrally provided at both ends, and is hollow over the entire length thereof;

wherein at least one of said joint connecting portions is a spline portion to be inserted into a joint;

wherein said shaft is subjected to induction hardening from the outer periphery thereof so that at the spline portions, the hardness on the inner surface of the shaft is lower than at other portions;

wherein the difference in hardness between the outer surface and the inner surface of the shaft at said spline portions is not less than $\Delta$HRC 9 in the Rockwell hardness;

wherein the ratio of the hardened depth to the wall thickness of the shaft at said spline portions is not less than 0.3, and the hardness on the inner surface of the shaft at the spline portions is not more than HRC 43 in Rockwell hardness;

wherein at said spline portions, unhardened layers remain on the inner surface of the shaft;

wherein the hardened depth at said spline portions is such that it smoothly deepens from a tip end of said each spline portion toward a proximal end thereof; and wherein portions of the shaft where the hardness on the inner surface of the shaft is lower than at other portions respectively have inner end terminal portions located adjacent to spline shoulder portions provided at the proximal ends of said spline portions.

* * * * *